United States Patent
Karvanen

(10) Patent No.: US 12,114,613 B2
(45) Date of Patent: Oct. 15, 2024

(54) FELLING UNIT AND METHOD OF HARVESTING SMALL-DIMENSIONED WOOD

(71) Applicant: Jani Karvanen, Perheniemi (FI)

(72) Inventor: Jani Karvanen, Perheniemi (FI)

(*) Notice: Subject to any disclaimer, the term of this patent is extended or adjusted under 35 U.S.C. 154(b) by 934 days.

(21) Appl. No.: 17/049,222

(22) PCT Filed: Apr. 16, 2019

(86) PCT No.: PCT/FI2019/050309
§ 371 (c)(1),
(2) Date: Oct. 20, 2020

(87) PCT Pub. No.: WO2019/202214
PCT Pub. Date: Oct. 24, 2019

(65) Prior Publication Data
US 2021/0368697 A1 Dec. 2, 2021

(30) Foreign Application Priority Data

Apr. 20, 2018 (FI) ...................................... 20185376

(51) Int. Cl.
*A01G 23/081* (2006.01)
*A01G 23/091* (2006.01)

(52) U.S. Cl.
CPC ......... *A01G 23/081* (2013.01); *A01G 23/091* (2013.01)

(58) Field of Classification Search
CPC .... A01G 23/08; A01G 23/081; A01G 23/083; A01G 23/091; A01G 23/093
See application file for complete search history.

(56) References Cited

U.S. PATENT DOCUMENTS

| 4,232,179 A | * | 11/1980 | Valladares Barrocas ................... |
| | | | C07C 1/24 |
| | | | 585/639 |
| 4,467,849 A | | 8/1984 | Denis |
| 4,592,398 A | | 6/1986 | Golob et al. |
| 5,697,412 A | | 12/1997 | Kurelek |
| 5,931,210 A | | 8/1999 | Kurelek |

FOREIGN PATENT DOCUMENTS

| DE | 102013110073 A1 | 3/2015 |
| FI | 112318 | 11/2003 |
| FR | 2553969 A1 | 5/1985 |
| WO | 9963801 A2 | 12/1999 |

OTHER PUBLICATIONS

International Search Report and Written Opinion for PCT/FI2019/050309 dated Jun. 7, 2019.
Extended European Search Report for Application No. 19788383.8 Dated Dec. 22, 2021.

* cited by examiner

*Primary Examiner* — Matthew Katcoff
(74) *Attorney, Agent, or Firm* — Christopher M. Scherer; DeWitt LLP

(57) ABSTRACT

A felling unit and a method of harvesting small-dimensioned wood in a forest. A felling unit comprises a cutting device with two disc blades and a cutting gap between them for cutting small-dimensioned trees. The cut small-dimensioned trunks are transferred from the cutting gap to a temporary storage space by means of a transfer device comprising two transfer shafts with a transfer gap between them. The disc blades and the transfer shafts are both rotated in opposite directions relative to each other, i.e. towards the cutting gap and the feeding gap.

3 Claims, 6 Drawing Sheets

FELLING UNIT AND METHOD OF HARVESTING SMALL-DIMENSIONED WOOD

CROSS-REFERENCE TO RELATED APPLICATIONS

Figure 1:
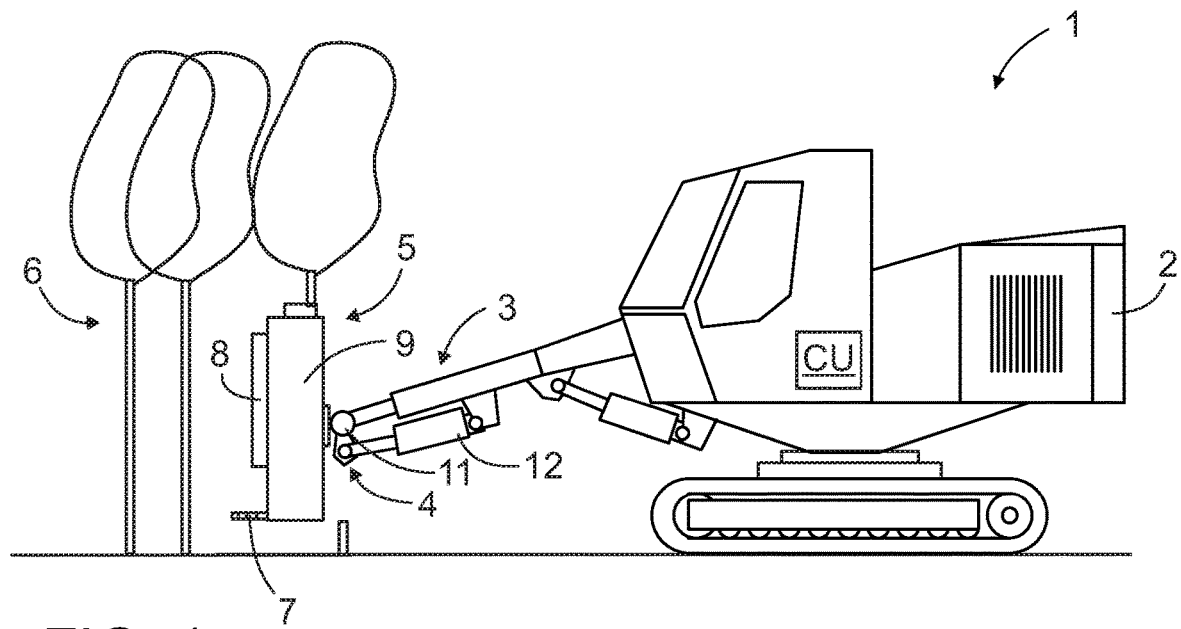

The present application is the U.S. national stage application of International Application No. PCT/FI2019/050309, filed Apr. 16, 2019, which international application was published on Oct. 24, 2019, as International Publication No. WO2019/202214. The International Application claims priority to Finnish Patent Application No. 20185376, filed Apr. 20, 2018, the contents of which are incorporated herein by reference in their entireties.

BACKGROUND OF THE INVENTION

The invention relates to a felling unit for cutting and processing small-dimensioned wood.

Further, the invention relates to a method of harvesting small-dimensioned wood.

The object of the invention is described in more detail in the preambles of independent claims of the application.

The use of renewable energy is intended to be increased. Thus, in the future the harvest of fuel wood and small-dimensioned wood will play an increasingly greater role in the production of energy. Small-dimensioned wood refers to wood which does not qualify as timber, and includes for example small-diameter wood from thinning or small-dimensioned wood being harvested from seedling stands and young forests. Further, to be able to ensure favourable growth conditions for a stand grown for logs, small-dimensioned wood must be removed from forests in connection with forest management. For the harvest of energy wood and small-dimensioned wood, various types of felling units have been developed, such as energy wood grapples and other devices processing multiple trees, by which small-dimensioned trees may be cut and also a number of trunks stored at the same time. However, some disadvantages have been observed in the structure and operation of the present felling units, due to which the harvest of small-dimensioned wood from a forest, in view of economical aspects, is difficult.

SHORT DESCRIPTION OF THE INVENTION

The inventive idea is to provide a new and improved felling unit and a method of harvesting small-dimensioned wood.

Characteristic features of the felling unit according to the invention are described in the characterizing part of the independent device claim.

Characteristic features of the method according to the invention are described in the characterizing part of the independent method claim.

The idea of the proposed configuration is that a felling unit for harvesting small-dimensioned wood comprises a frame with a coupling device for fitting the harvesting unit to a boom of a movable work machine, such as a forest tractor or a harvester. The felling unit comprises a cutting device for cutting standing small-dimensioned trunks and a temporary storage space for temporarily storing several cut small-dimensioned trunks before transfer to a storage site or to a loading space arranged in the work machine. Said cutting device comprises two opposed disc blades, their rims facing each other and forming a cutting gap between each other. The disc blades are arranged to rotate in opposite directions relative to each other and are driven by one or more rotating motors. Further, the felling unit comprises a transfer device for transferring cut small-dimensioned trunks in a feed direction from the cutting gap to the temporary storage space.

One advantage of the proposed configuration is that the cutting of small-dimensioned trunks is quick and is carried out continuously due to the disc blades. When the felling unit is operated, the disc blades are continuously exposed and ready to receive new small-dimensioned wood for cutting. The efficiency is improved even further in that the transfer device efficiently transfers small-dimensioned trunks cut in the cutting gap away from the cutting zone to the temporary storage space, such that they do not hinder the cutting of new trunks. Thus, the cutting and transfer of small-dimensioned trees is carried out with efficient cooperation between the cutting device and the transfer device. The temporary storage space integrated in the felling unit is able to receive a large number of cut small-dimensioned trunks, such that the felling unit may be efficiently operated for quite a long time before the temporary storage space becomes full and must be emptied.

A further advantage of the rotating disc blades is that their blade edge is remarkably long, since their entire outer rim functions as a cutting surface. A long blade edge is affected by less wearing stress, such that the useful life of the disc blades may be long. Yet another advantage is that the small-dimensioned wood is guided smoothly to the cutting gap between the curved outer surfaces of the disc blades and cutting occurs evenly in this narrowing gap, due to which the cutting force may be lower and no impact stress is applied to the structure.

The idea of one embodiment is that the cutting device and the transfer device are arranged to cut and transfer the small-dimensioned trunks as a continuous successive and uninterrupted process from the cutting gap to the temporary storage. Due to the continuous cutting and transfer operation, the efficiency and processing rate of the felling unit may be noticeably better than in the processing devices and energy wood grapples of the prior art, in which cutting and transfer are performed as a periodic batch run in which the cutting and transfer device alternately perform a work cycle and a return cycle. In the presently proposed configuration, the operations of the cutting device and the transfer device are based on a rotating motion the use of which is clearly more efficient than the reciprocating motion used in the configurations of the prior art. As the proposed felling unit has a better efficiency than the prior art devices, the harvest of small-dimensioned wood also becomes economically viable both for the buyer of wood and for the forestry machine entrepreneur. This way, small-dimensioned wood can be obtained for energy use and backlog in the management of young forests can be cleared.

The idea of one embodiment is that the felling unit may be positioned, i.e. moved and fed by means of the boom of the forestry machine towards the small-dimensioned wood to be processed. The felling unit may be fed continuously, also during the cutting and transfer operations, so that the cutting gap can be continuously supplied with new small-dimensioned wood for processing. Thus, moving of the boom does not need to be stopped for the duration of processing, at least when small-dimensioned trees in seedling stands are being processed.

The idea of one embodiment is that the transfer device comprises a first transfer shaft and a second transfer shaft that are parallel to each other. The transfer shafts are located at the cutting gap of the felling unit at a transverse distance from each other. The transfer shafts are rotatable in opposite directions relative to each other by means of one or more first rotating devices. The transfer shafts are rotated in the harvesting direction, i.e. towards a feeding gap remaining between them. Further, both of the transfer shafts are provided with several transfer projections. When the transfer shafts are rotated about their longitudinal axes, the transfer projections push the small-dimensioned trunks cut by the disc blades in the feed direction from the cutting gap towards the temporary storage space. The transfer shafts may be rotated continuously when the cutting device is being operated.

The idea of one embodiment is that the transfer shafts arranged in the transfer device are vertical when the felling unit is in the normal cutting position. Further, the rotating shaft of the disc blades of the cutting device is vertical when the felling unit is in the normal cutting position.

The idea of one embodiment is that both of the transfer shafts of the transfer device comprise at least 6 transfer projections. Preferably there are 6-10 transfer projections per transfer shaft.

The idea of one embodiment is that the transfer projections of the transfer device are arranged on the transfer shafts at several different levels and in several different radial directions. In addition, the transfer projections of the adjacent transfer shafts are arranged such that when the transfer shafts are stopped at any rotating position, at least one of the transfer projections lands at the cutting gap, preventing the cut small-dimensioned trunks from exiting the temporary storage space. By arranging the transfer projections over the whole axial length and outer surface of the transfer shafts, smooth and efficient transfer of the small-dimensioned trunks away from the cutting gap to the temporary storage space may be ensured. In addition, the transfer projections prevent the small-dimensioned trunks from accidentally falling off the temporary storage space, for example when the boom of the forestry machine is being transferred. By arranging the transfer projections in several radial directions, a large number of impact forces pushing towards the temporary storage may be applied to the small-dimensioned trees to be transferred.

The idea of one embodiment is that both of the transfer shafts of the transfer device comprise transfer projections along a segment that is at least 800 mm long as seen in the longitudinal direction of the transfer shaft. When the transfer projections are arranged along a relatively long distance, even the longer cut small-dimensioned trunks are not able to fall or tilt detrimentally during the transfer. A transfer force is also applied to the small-dimensioned trunks at a distance from their base. This way, the transfer is carried out in a controlled manner and it is possible to avoid blockages and other disturbances.

The idea of one embodiment is that the transfer device is utilized for emptying the temporary storage space. Thus, in addition to the storing operation the transfer device may also perform an unloading operation. The transfer shafts of the transfer device are rotatable in an opposite direction relative to the feed direction when the small-dimensioned trunks are unloaded from the temporary storage space. This way, the transfer projections push the small-dimensioned trunks through the feeding and cutting gap out from the felling unit. For the time of unloading, the felling unit may be turned by means of the boom, or the coupling device arranged between the boom and the felling unit, from the normal vertical operating position to a horizontal unloading position. When the felling unit is turned to the unloading position, its cutting gap is facing towards an unloading site on the ground or a loading space of the work machine. During unloading of the temporary storage space, the small-dimensioned trunks are thus, in addition to the unloading force applied by means of the transfer projections, also subject to gravity, due to which unloading may be performed efficiently and quickly. The efficient unloading capacity also improves the overall efficiency of the felling unit.

The idea of one embodiment is that the transfer shafts of the transfer device comprise several transfer projections. Each of these transfer projections is pivotably coupled by means of a hinge to the outer surface of the transfer shaft. In addition, at least part of the transfer projections are arranged to be subject to a spring force that tends to hold the transfer projections in the projected feeding position when the transfer shaft rotates in the feed direction. However, the transfer projections may pivot from the projected feeding position towards the outer surface of the transfer shaft, if an external force applied to the transfer projections exceeds the spring force applied to them. When the transfer projections give way, it is possible to avoid jamming of the transfer device and interruptions in harvesting. If there are a number of small-dimensioned trunks requiring a high transfer force in the cutting gap, the transfer forces from several transfer projections may be applied to them successively, even if the transfer projections yield. When further the transfer shafts are continuously rotated about their axes, each of the transfer projections may come into contact with a small-dimensioned trunk being transferred for a number of times. A transfer device provided with the pivotable transfer projections is thus able, without breaking structures and interrupting the operation, to also handle situations requiring higher transfer forces.

The idea of one embodiment is that the spring force of the pivotable transfer projections is adjustable according to e.g. quality and diameter of the small-dimensioned trees being processed and thickness of the stand. The transfer force and motion may be adjusted by adjusting the spring force.

The idea of one embodiment is that a mechanical spring force is applied to the transfer projections. In this case the transfer projection may be pushed towards the feeding position, i.e. against a mechanical limiter of the feeding position, by means of a spring element, such as a coil, spiral or flat spring. The magnitude of the transfer force transmitted by means of the transfer projections is proportional to the spring forces of the transfer projections and it is adjustable by changing the spring elements or by adjusting their preloading. The advantage of the mechanical spring elements is their simple structure and durability. In addition, the spring elements and the structure formed by using them are affordable in terms of costs. Another advantage of the mechanical spring force is that its generation does not require any external operating energy and control.

The idea of one embodiment is that a hydraulic spring force is applied to the transfer projections. In this case the transfer projection may be pushed towards the feeding position by means of a hydraulic actuator, such as a hydraulic cylinder. The spring force is thereby adjustable by adjusting the pressure being supplied to the hydraulic cylinder. The transfer force to be provided may this way be adjusted by means of the hydraulic pressure. One advantage of the hydraulically generated spring force is that the magnitude of the force may be controlled remotely and in real time. Further, it is possible to supply unequal pressures to the actuators of different transfer projections and thus generate unequal spring forces for example for the transfer projections of the lower and upper parts of the feeding shaft, if necessary. The pressure of the hydraulic fluid transmitted to the actuator may be controlled by means of an adjusting device or an adjusting element arranged in the cab or on the chassis of the work machine. Further, if the operation of the felling unit is controlled by means of a control unit, the adjustment of the spring force may be carried out programmatically or by means of a user interface.

The idea of one embodiment is that the pivoting of the transfer projections is limited in the unloading direction. Thus, when the transfer shafts rotate in the unloading direction opposite to the feed direction, the free pivotability of each of the transfer projections away from the feeding position is mechanically limited. In other words, the movement of the transfer projections is mechanically limited in one direction in the feeding position, and the movement yields under spring load in the opposite direction. In practice, the spring force thus pushes the transfer projection to its extreme position against the limiter and tends to hold the transfer projection in the maximum feeding position. The limiter may comprise a locking projection located on the opposite side of the pivot hinge of the locking projection relative to the transfer arm of the locking projection. The locking projection may be supported against the outer surface of the transfer shaft or a corresponding support surface.

The idea of one embodiment is that the disc blades of the cutting device are mounted on a part of first ends of the transfer shafts of the transfer device. On a part of second ends of the transfer shafts, on the other hand, there are power transmission elements for transmitting the rotation from one or more first rotating devices to the transfer shafts. The transfer shaft and the disc blade mounted to its lower end are thus rotated coaxially and simultaneously.

The idea of one embodiment is that both of the transfer shafts of the transfer device and the disc blades mounted to their lower ends are rotated by their own first rotating devices. This way, both of the rotating devices may be compactly arranged in the vicinity of the upper ends of the transfer shafts.

The idea of one embodiment is that both of the transfer shafts of the transfer device and the disc blades mounted to them are rotated by means of one common first rotating device. When a single rotating device is arranged to generate all rotating motions needed for both cutting and transfer, the structure may be light-weight and simple.

The idea of one embodiment is that one or more first rotating devices for moving the transfer shaft comprise a hydraulic motor for generating the rotating motion as well as power transmission elements for transmitting the rotating motion to the transfer shafts. For example, a chain or a power transmission belt, such as a toothed or V belt, may be used as the power transmission element. Further, it is possible to transmit the rotating motion by means of a transmission to the transfer shaft or couple the rotating motor directly to the transfer shaft, i.e. to use a so-called direct drive. Hydraulic power needed for the hydraulic motor is typically well available in the booms of work machines, and the hydraulic motor is also an efficient, durable and maintenance-free actuator.

The idea of one embodiment is that both of the transfer shafts of the transfer device comprise, at their upper part, a drum part having a larger diameter, on the outer rim of which there are several transfer projections. In the lower part of both of the transfer shafts there is, on the other hand, an extension having a smaller diameter, to which the disc blade is mounted. Due to the drum parts, the width of the transfer gap being formed between the transfer shafts may be reduced, such that the transfer projections may be shorter and more durable. Further, when the disc blades are fitted on the transfer shafts, it is possible to adjust the distance between the centre axes of the transfer shafts to be relatively long, so that the disc blades arranged at the lower end of the transfer shafts may have a large diameter and thereby a greater peripheral speed and reach.

The idea of one embodiment is that both of the transfer shafts of the transfer device have a uniformly thick structure, i.e. the transfer shafts are not provided with the thicker drum parts as in the above embodiment.

The idea of one embodiment is that the operation of the cutting device and the feeding device may be controlled independently of each other. This is enabled when the disc blades of the cutting device comprise their own rotating shafts about which they are arranged to be rotated by means of one or more second rotating devices. In this case, the felling unit comprises at least one first rotating device for operating the feeding shafts and at least one second rotating device for operating the disc blades, the first and second rotating devices being separate from each other. Both of the first and the second rotating device may be controlled independently. This makes it possible to adjust the rotating speed of the disc blades relative to the rotating speed of the feeding shafts to be unequal. The felling unit operator may this way adjust the ratio between the rotating speeds according to situation and stand to be processed. Further, the centre lines of the rotating shafts of the disc blades do not need to be on the same axial line with the centre lines of the feeding shafts, such that it is possible, for example, to arrange the rotating shafts of the disc blades at a greater distance from each other and thus use disc blades having a larger diameter so as to provide a larger feeding zone.

The idea of one embodiment is that the felling unit comprises a feeding zone that is approximately equally wide as its frame on the front side of the felling unit. The outer rims of the rotating disc blades of the cutting device tend to transfer the small-dimensioned trees to be cut continuously towards the cutting gap. This provides the advantage that the felling unit need not be positioned precisely at each of the small-dimensioned trees to be cut.

The idea of one embodiment is that the outer rims of the disc blades of the cutting device are toothed. Thus, the cutting device comprises two rotating toothed disc blades the rotating directions of which are opposite so as to form the cutting gap. When the small-dimensioned trees to be cut end up in this cutting gap, the teeth of the disc blades sink into the wood, drawing it deeper into the gap. The cutting of the tree is thus carried out partly in a guillotine-type manner with a shearing force, as the cutting gap narrows down towards the temporary storage space, and also partly in a chipping motion carried out across the wood grain, resulting from the rotating motion and the toothing. The blade teeth may penetrate deeper in the wood structure so as to crush it. The movement of thicker trees in the cutting gap may slow down, in which case cutting is performed utilizing a sawing motion of the teeth of the disc blades.

The idea of one embodiment is that the outer rims of the disc blades of the cutting device are toothed. In addition, the toothings of the disc blades are different handed relative to each other, because the opposite disc blades are arranged to rotate in opposite directions relative to each other.

The idea of one embodiment is that the toothing arranged on the outer rim of the disc blade of the cutting device comprises several blade teeth having a point, a straight or inclined rake face and a curved flank on the opposite side relative to the rake face. The disc blade is arranged to be rotated rake face first towards the feed direction, such that the rotating toothed outer rim is arranged to feed the small-dimensioned trees to be cut towards the cutting gap. The two adjacent toothed disc blades thus form a horizontal feeding zone that is at least 500 mm wide on the front side of the felling unit, the small-dimensioned trees being guided from the feeding zone to the cutting gap by the effect of the rotation of the disc blades. Due to the wide feeding zone and the blade teeth that move towards the cutting gap, the harvest of small-dimensioned wood is efficient and the felling unit may be moved quickly.

The idea of one embodiment is that the diameter of the disc blade is at least 250 mm. The larger the diameter of the disc blades, the wider is the feeding zone formed on the front side of the felling unit. Further, larger disc blades have a higher peripheral speed, which makes cutting more efficient.

The idea of one embodiment is that the teeth of the disc blades comprise bits joined to the base material of the teeth for example by soldering. The material of the bits is harder material than the base material of the disc blades such as, for example, hard metal. Due to the hard bits, the disc blades remain sharp for a longer time and ensure an efficient and long useful life.

The idea of one embodiment is that the outer rim of the disc blades is equipped with a saw chain or a corresponding separate element with teeth for feeding the small-dimensioned trees and also for facilitating the cutting performed in the cutting gap.

The idea of one embodiment is that, after the cutting gap formed by the disc blades there is, as seen in the feed direction, a substantially triangular distributing element arranged to guide the lower ends of the cut small-dimensioned trunks smoothly to the temporary storage space.

The idea of one embodiment is that the temporary storage space of the felling unit is delimited by a back wall arranged in the frame structure of the felling unit, which may be substantially U- or V-shaped in cross-section and which opens towards the feeding shafts delimiting the front side of the temporary storage space and the gap arranged between them. Further, the temporary storage space comprises a bottom an upper surface of which is arranged to support the cut small-dimensioned trunks in the vertical direction.

The idea of one embodiment is that the temporary storage space is sized to receive at least 15 small-dimensioned trunks having a diameter of 50-60 mm.

The idea of one embodiment is that the cut small-dimensioned trunks are freely in the temporary storage space without continuous pressure against the back wall of the frame of the felling unit. The transfer device prevents the small-dimensioned trunks from falling out through the feeding gap.

The idea of one embodiment is that the felling unit comprises at least one control unit arranged to control the operations of the cutting device and the transfer device. The control unit may comprise a processor in which a software product may be executed for automatic or semi-automatic control of the felling unit. The control unit of the forestry machine may be arranged to control the operation of the felling unit by executing programs configured for controlling the felling unit. Alternatively, there may be a separate control unit for the felling unit. Further, it is possible that the control unit is a programmable logic controller or a corresponding control device.

The idea of one embodiment is that the felling unit is arranged at least partly to be controlled by the control unit. The control unit may comprise several selectable sequences for automatically controlling the cutting device and the transfer device of the felling unit.

The idea of one embodiment is that the felling unit comprises one or more sensors for monitoring the operation of the felling unit. The undisturbed operation of the cutting device and the transfer device may be monitored by means of detectors and measuring instruments, and the control unit may adjust the rotating speeds and give the operator control information for positioning and feeding the felling unit. Further, it is possible to identify the loading level of the temporary storage space and the need of emptying it, as well as to indicate the operator a need to position to an unloading site for starting an automatic unloading sequence that turns the felling unit to a horizontal direction and starts the feeding device unloading operation. Thus, the control unit may control the operation of the felling unit in response to the measurement data obtained from the sensors of the felling unit.

The idea of one embodiment is that the coupling device in the frame of the felling unit comprises a first turning mechanism for tilting the felling unit from a vertical position to a horizontal position. The first turning mechanism may comprise a horizontal hinge and a turning actuator, such as a hydraulic cylinder. The first turning mechanism is needed at least for the temporary storage space unloading operation. When the turning may be performed by the coupling device, it is simple and quick because the boom of the work machine does not have to be driven to a turning position.

The idea of one embodiment is that the coupling device in the frame of the felling unit comprises a second turning mechanism for turning the felling unit in the lateral direction. This feature facilitates and quickens the positioning of the felling unit. Further, the felling unit may be controlled with precision without damaging trees being left to grow as well as without hitting rocks and other obstacles. The second turning mechanism may comprise a vertical hinge and a turning actuator, such as a hydraulic cylinder.

The idea of one embodiment is that the coupling device arranged in the frame of the felling unit comprises a suspension coupling device by which the felling unit may be suspended from a rotating device arranged at the end of the boom of a forestry machine. Due to the suspension coupling device, the harvester unit of a forest harvester may be replaced with the felling unit of this application when, instead of pulpwood and logs, small-dimensioned wood is harvested from a seedling stand or a young forest. Further, it is possible to replace the grapple arranged in the crane of a forwarder with the proposed felling unit, in which case the forwarder may be utilized for the harvest and short distance hauling of small-dimensioned wood.

The idea of one embodiment is a method in which a movable work machine is used for harvesting small-dimensioned wood, the movable work machine comprising at least one boom or crane provided with a felling unit. By means of a cutting device arranged in the felling unit, several standing small-dimensioned trees are cut and after cutting they are temporarily stored in a temporary storage arranged in the felling unit. After this, the small-dimensioned trunks stored in the temporary storage are transferred to a storage station by means of the boom. The small-dimensioned trees are cut between two disc blades rotating in opposite directions relative to each other. In addition, the cutting of small-dimensioned trunks and their transfer to the temporary storage are performed simultaneously.

The idea of one embodiment is a method in which several small-dimensioned trunks are stored in the temporary storage to form a batch of small-dimensioned trunks before the temporary storage is emptied and transfer to the storage station is carried out. Further, the cutting of small-dimensioned trunks and their transfer to the temporary storage are performed continuously during one batch of small-dimensioned trunks. Due to the continuous work process, working is efficient and operation of the device is easy.

The idea of one embodiment is a forest tractor or a forestry machine provided with a movable off-road chassis and with at least one forestry boom. Further, the boom is provided with the felling unit according to this application for harvesting small-dimensioned wood from a forest.

The idea of one embodiment is that the transfer shafts are supported to the frame in a transversely moveable manner and are pushed towards each other by means of a spring force. During the feeding operation, the feeding shafts may move away from each other, depending on the thickness of the fed small-dimensioned trees. In other words, in this embodiment the width of the feeding gap varies according to the small-dimensioned trees being processed. Further, the outer surfaces of the transfer shafts may be provided with several fixed transfer projections, such as bulges or pins. The transfer shafts may be supported to the frame for example by means of a slide mechanism, and a mechanical spring force or a spring force provided by means of a pressure medium device may be applied to them.

The essential idea of one embodiment is that the transfer shafts comprise, in the longitudinal direction of the transfer shafts, several disc-type pieces the outer rims of which jointly form the tractive outer surfaces of the transfer shafts. The disc-type parts may be arranged at an axial distance from each other and they may be arranged along the full extent of the feeding gap. The outer rims of the disc-type pieces may comprise feeding projections.

The embodiments described above and the features described in connection with the embodiments may be combined to provide desired configurations.

SHORT DESCRIPTION OF THE FIGURES

Figure 2:
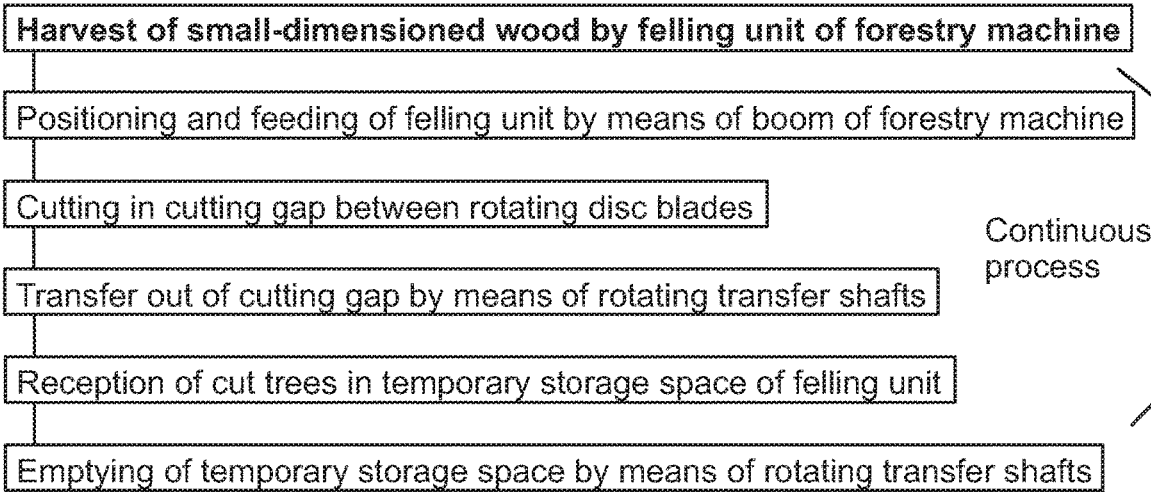
Figure 3:
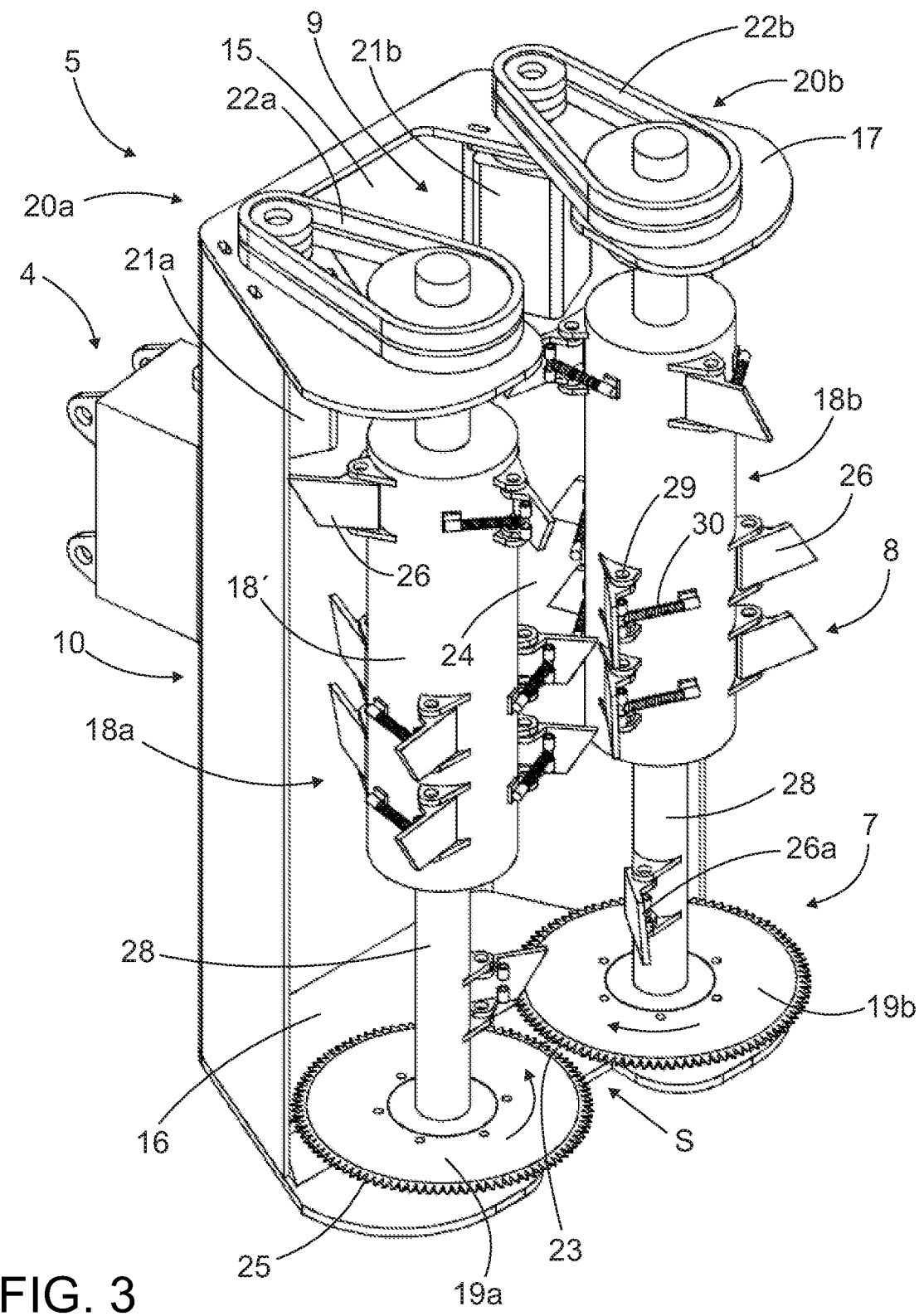
Figure 4:
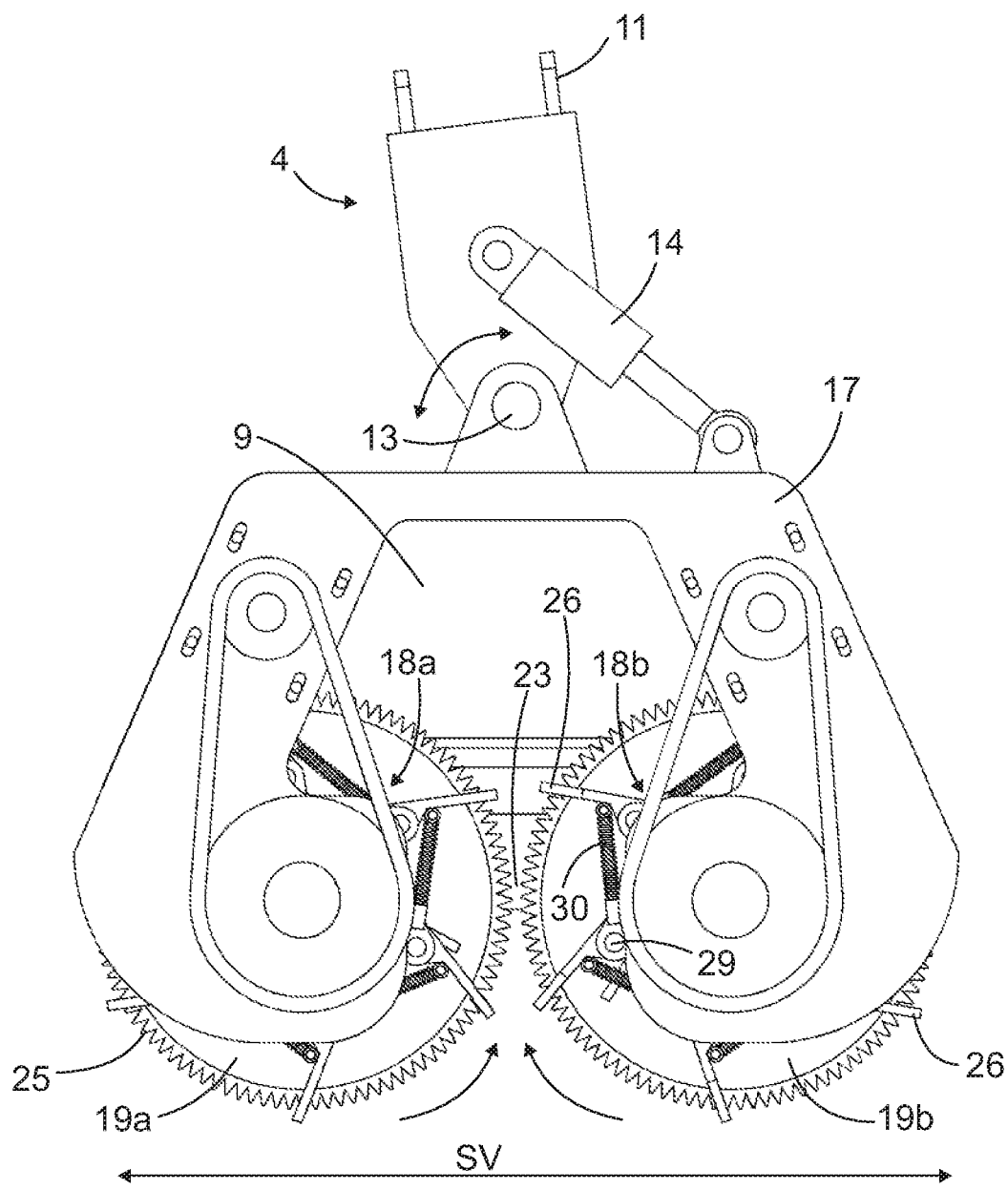
Figure 5:
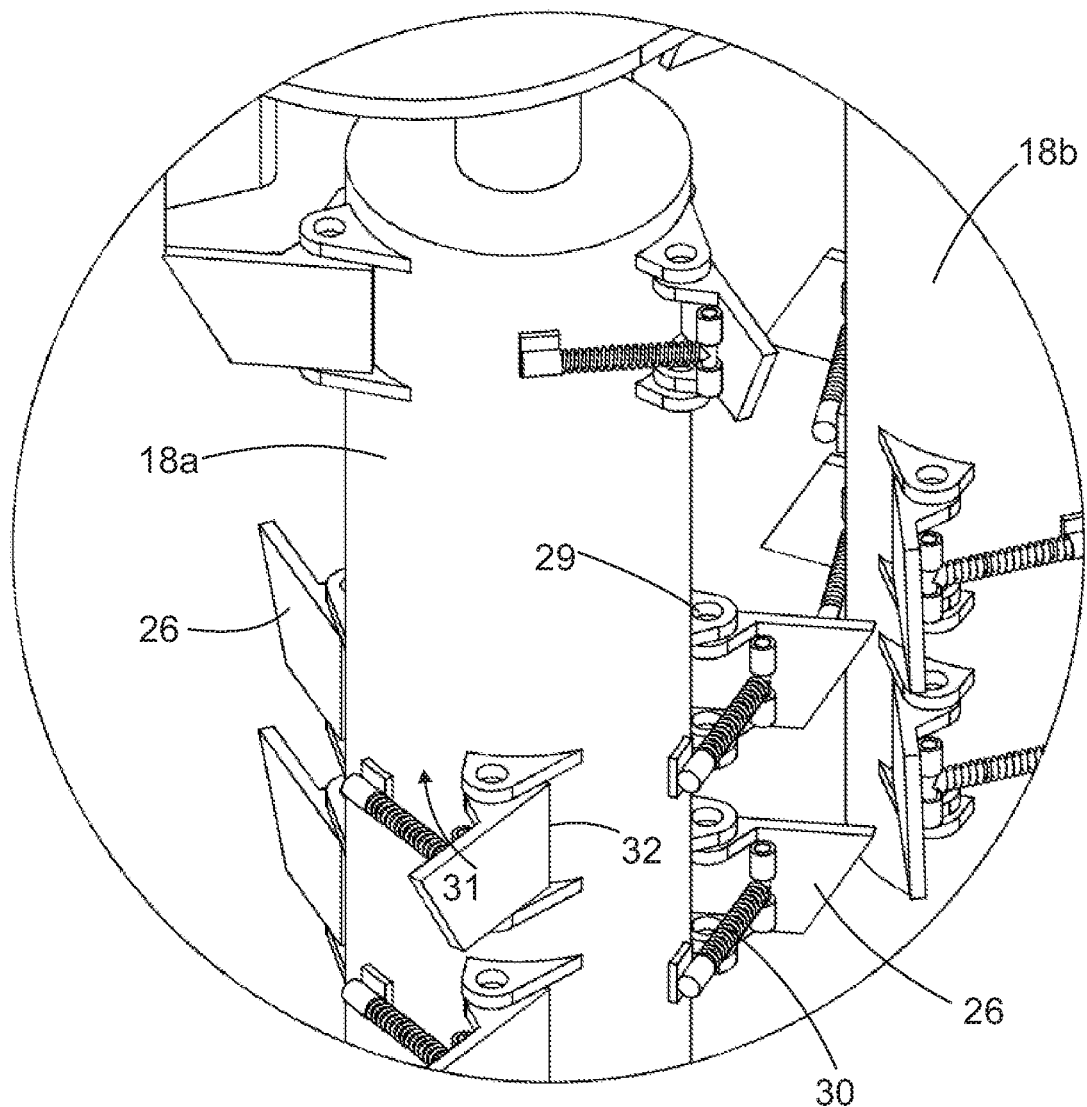
Figure 6:
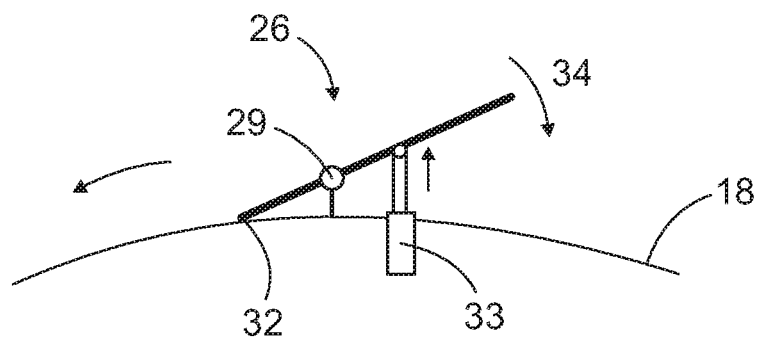
Figure 7:
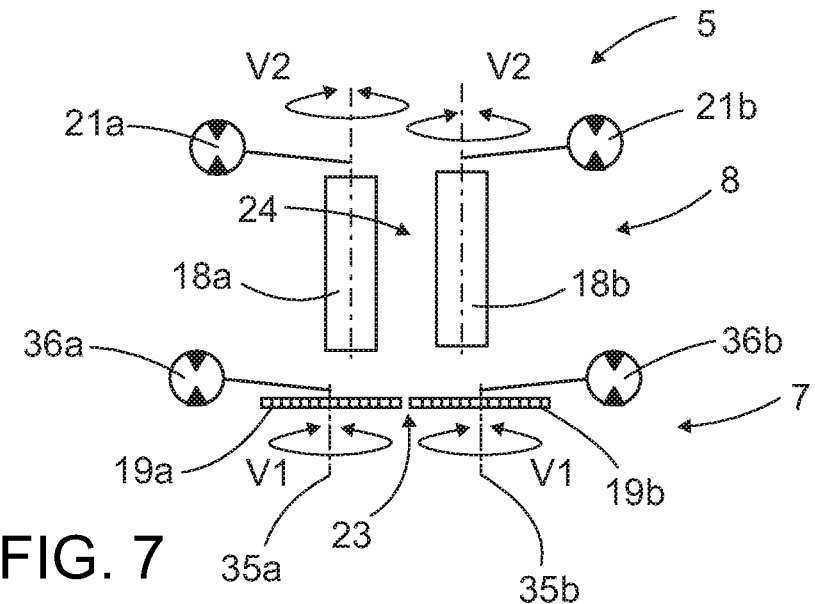
Figure 8:
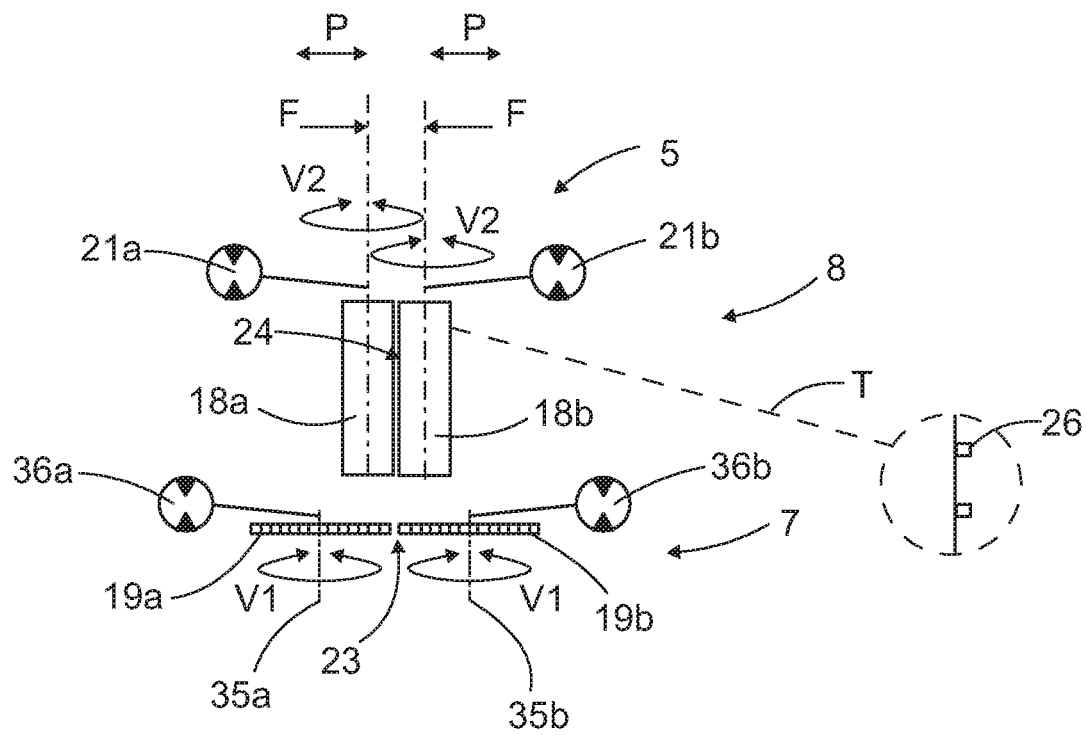
Figure 9:
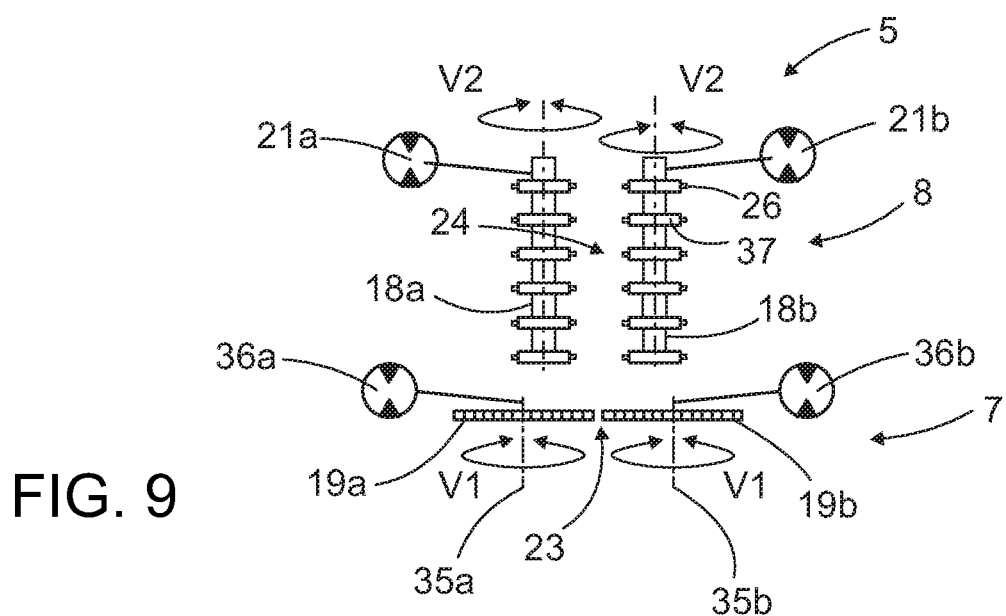

Some embodiments of the proposed configuration are illustrated in more detail in the accompanying figures, in which FIG. 1 schematically illustrates one forestry machine a boom of which is provided with a felling unit for harvesting small-dimensioned wood, FIG. 2 illustrates a simplified diagram of different steps in the harvest of small-dimensioned wood, FIG. 3 schematically illustrates one felling unit, FIG. 4 schematically illustrates the felling unit of FIG. 3 as a top view, FIG. 5 schematically illustrates a detail of a transfer shaft and transfer projections in a transfer device of a felling unit, FIG. 6 schematically presents the principle of one alternative transfer projection, FIG. 7 schematically presents the principle of one alternative construction as a front view, FIG. 8 schematically presents one construction in which the feeding shafts may move in a transverse direction, and FIG. 9 schematically presents one construction in which the feeding shafts comprise several disc-type elements arranged one above the other.

For clarity purposes, some embodiments of the proposed configurations are presented in a simplified form in the figures. The same elements and features are indicated in the figures with the same reference numerals.

DETAILED DESCRIPTION OF SOME EMBODIMENTS

FIG. 1 illustrates a forestry machine 1 comprising a movable chassis 2 as well as a boom 3 coupled to the chassis 2. The forestry machine 1 may be for example a track excavator as illustrated in the figure, or alternatively a forest tractor, forwarder or forest harvester. A felling unit 5 is attached to the boom 3 by means of a coupling device 4 for harvesting small-dimensioned wood 6. The felling unit 5 comprises a cutting device 7 by which the standing small-dimensioned trees 6 are cut from the base, and a transfer device 8 by which the cut small-dimensioned trunks are transferred to a temporary storage space 9 in the felling unit 5. In FIG. 1 the felling unit 5 is in the operating position arranged in the vertical direction. The forestry machine 1 comprises a control unit CU which may be arranged to also control the operation of the felling unit 5.

FIG. 2 shows a diagram illustrating the steps in the harvest of small-dimensioned wood. The felling unit 5 may be fed against the small-dimensioned trees 6 to be harvested by means of the boom 3, such that the rotating disc blades of the cutting device 7 cut the small-dimensioned trees 6 from the base. The transfer device 8 then transfers the cut small-dimensioned trunks to the temporary storage 9 in a vertical position. The feeding motion, cutting, transfer and temporary storage may be performed as a continuous process until the temporary storage space 9 is full. The temporary storage space 9 is then emptied and the harvest of a new batch of trees begins.

The felling unit 5 illustrated in FIG. 3 comprises a frame 10 provided with a coupling device 4 for attaching the felling unit to the boom of a forestry machine. The coupling device 4 may comprise a first hinge 11 shown in FIG. 1, about which the felling unit 5 may be turned from the vertical upright position shown in FIG. 1 to a horizontal unloading position by means of a hydraulic cylinder 12. Further, the coupling device 4 may comprise a second hinge 13 shown in FIG. 4, relative to which the felling unit 5 may be oriented by means of a hydraulic cylinder 14. As further shown in FIGS. 3 and 4, the frame 10 may have a shape corresponding to the letter U, whereby a temporary storage space 9 is naturally formed therein. The frame 10 comprises a back wall 15 and a bottom 16. In the upper part of the frame 10 there is a cover part 17 with an opening at the temporary storage space 9, so that the cut small-dimensioned trunks may extend up therethrough. The transfer device 8 comprises two parallel transfer shafts 18a and 18b supported to the bottom 16 and to the cover part 17. To the lower part of the transfer shafts 18a, 18b, two disc blades 19a, 19b of the cutting device 7 are mounted, whereby the transfer shafts 18 and the disc blades 19 are rotated simultaneously by means of rotating devices 20a, 20b. The rotating devices 20a, 20b may comprise rotating motors 21a, 21b as well as power transmission elements 22a, 22b such as chains or belts.

The disc blades 19a, 19b and correspondingly the transfer shafts 18a, 18b are rotated in opposite directions relative to each other towards a cutting gap 23 formed between the disc blades 19 and a transfer gap 24 formed between the transfer shafts 18. For harvesting, the small-dimensioned trees are transferred in a feed direction S towards the temporary storage 9, and for emptying in an opposite removing direction.

The outer rims of the disc blades 19 may be toothed 25, such that the disc blades 19 may feed the small-dimensioned trees to be cut towards the cutting gap 23. Thus, the disc blades form a feeding zone SV on the front side of the felling unit 5 as shown in FIG. 4.

The upper parts of the transfer shafts 18 may be provided with drum parts 18' having a larger diameter, on the outer rims of which there are several transfer projections 26. In the lower part of both of the transfer shafts 18 there may be extensions 28 having a smaller diameter, to which the disc blades 19 are mounted. The extensions 28 may also comprise transfer projections 26*a* for a removal operation.

As seen in FIG. 3-5, the outer rims of the transfer shafts 18 are provided with several transfer projections 26 located at different axial and radial positions on the outer rim of the transfer shafts 18. The transfer projections 26 are tab- or finger-type elements which are each pivotably bearing-mounted by means of a hinge 29 and which are pushed to a projected transfer position by means of a spring element 30. The transfer projections 26 may pivot from their extreme projected position towards the outer surface of the transfer shaft, as FIG. 5 illustrates with an arrow 31. On the opposite side of the hinge 29 there may be a limiter part 32 which mechanically limits the movement of the transfer projection in the other direction. The movement of the transfer projection 26 towards the transfer direction is spring-loaded and in the unloading direction the coupling is mechanically unyielding.

FIG. 6 presents a very simplified view of one alternative transfer projection 26 which is pushed towards the extreme projected feeding position by means of a pressure-operated actuator, such as a hydraulic cylinder 33. A hydraulic force holds the limiter part 32 against the outer surface of the transfer cylinder 18 while enabling, as needed, a yielding pivoting movement 34 of the transfer projection 26. Alternatively, it is possible to use a compressed air cylinder.

FIG. 7 presents a very simplified view of one alternative configuration in which the disc blades 19*a*, 19*b* are arranged on their own shafts 35*a*, 35*b* and they are operated with their own rotating motors 36*a*, 36*b*. In this case, rotating speeds V1 of the cutting device 7 and rotating speeds V2 of the transfer device 8 may be unequal and separately adjustable. Further, the shafts 35*a*, 35*b* may be spaced at a greater distance from each other than the centre lines of the transfer shafts 18, whereby the disc blades 19*a*, 19*b* may have a larger diameter.

FIG. 8 presents a configuration in which the feeding shafts 18*a*, 18*b* may move in a transverse direction P, such that the width of the feeding gap 24 varies according to the small-dimensioned trees being processed. The feeding shafts 18*a*, 18*b* may be pushed by a spring force F towards each other, whereby they press the small-dimensioned trees fed to the feeding gap 24, ensuring good friction and feeding force. Detail T indicates that on the outer rim of the transfer shafts 18*a*, 18*b* there are fixed bulges or the like, operating as the transfer projections 26.

FIG. 9 presents a configuration in which the feeding shafts 18*a*, 18*b* comprise several disc-type elements 37 arranged one above the other, the outer rims of which jointly form the outer rims of the transfer shafts. The outer rims of the discs 37 may be provided with the transfer projections 26 which may be, for example, fixed bulges as shown in FIG. 8, or alternatively spring-loaded or pressure medium operated transfer projections 26 may also be used.

The figures and their description are only intended to illustrate the inventive idea. The scope of protection of the invention is, however, defined in the claims of the application.

The invention claimed is:

1. A method of harvesting small-dimensioned wood, the method comprising:
using, for the harvest of small-dimensioned wood, a movable forestry machine comprising at least one boom provided with a felling unit;
cutting, by means of a cutting device arranged in the felling unit, several standing small-dimensioned trunks;
temporarily storing the cut small-dimensioned trunks in a temporary storage in the felling unit;
transferring small-dimensioned trunks stored in the temporary storage to a storage station by means of the boom;
and wherein the cutting is carried out in the cutting device between two disc blades rotating in opposite directions relative to each other; and
the cutting of small-dimensioned trunks and their transfer to the temporary storage are performed simultaneously;
wherein the cut small-dimensioned trunks are transferred in a feed direction to the temporary storage by means of two spaced apart transfer shafts rotating in different directions and several transfer projections arranged on their outer surfaces, and
wherein the transfer shafts are rotatable in an opposite direction relative to the feed direction when the cut small-dimensioned trunks are unloaded from the temporary storage space such that the transfer projections are arranged to push small-dimensioned trunks out from the felling unit via a feeding gap.

2. The method according to claim 1,
wherein several small-dimensioned trunks are stored in the temporary storage to form a batch of small-dimensioned trunks before the temporary storage is emptied and transfer to the storage station is carried out; and
wherein the cutting of small-dimensioned trunks and their transfer to the temporary storage are performed continuously during one batch of small-dimensioned trunks.

3. The method according to claim 1, wherein the disc blades and the feeding shafts are rotated simultaneously during the harvest of small-dimensioned wood.

* * * * *